United States Patent [19]

Blau, Jr. et al.

[11] 4,449,178

[45] May 15, 1984

[54] METHOD AND APPARATUS FOR CONTROLLED OFF PEAK LOAD HOT WATER HEATING

[75] Inventors: Frederick Blau, Jr., Fountain Valley; John M. Gross, San Jose, both of Calif.

[73] Assignee: Fluidmaster, Inc., Anaheim, Calif.

[21] Appl. No.: 239,170

[22] Filed: Feb. 27, 1981

[51] Int. Cl.³ .................... G05D 23/19; F24H 1/20
[52] U.S. Cl. ................... 364/148; 219/328; 219/364; 219/492; 364/505
[58] Field of Search .............. 364/505, 148; 219/328, 219/334, 364, 483, 490, 491, 492

[56] References Cited

U.S. PATENT DOCUMENTS 2,238,624 4/1941 Clark ......................... 219/328
4,305,005 12/1981 McKenney et al. ........... 219/483 X

FOREIGN PATENT DOCUMENTS 52-33149 3/1977 Japan ......................... 219/334
52-34439 3/1977 Japan ......................... 219/334
55-131643 10/1980 Japan ......................... 219/329
2048525 12/1980 United Kingdom ........... 219/492

Primary Examiner—Felix D. Gruber
Attorney, Agent, or Firm—Mahoney & Schick

[57] ABSTRACT

Apparatus and method for controlling a hot water heater to heat water during off peak load hours to a desired temperature by the end of a predetermined period of time. The heating is in partial increments, the water being heated a partial amount in each of a plurality of predetermined time segments with a view to reaching the desired temperature at the end of the predetermined time period. The water is heated by adjusting the heater at each segment to its maximum power or a portion thereof. The method includes the steps of computing the heater power required for the next time segment, setting the heater power accordingly, waiting until the end of the time segment, determining the new temperature of the water, and repeating the steps until the end of the time period.

14 Claims, 4 Drawing Figures

| TIME | T | ΔT | NS | k | DUTY CYCLE | °T. RISE |
|---|---|---|---|---|---|---|
| 10 PM | 110.0 | 50.0 | 10 | 0.02 | .100 | — |
| 11 PM | 114.0 | 46.0 | 9 | 0.025 | .128 | 4.0 |
| 12 MID | 119.1 | 40.9 | 8 | 0.025 | .128 | 5.1 |
| 1 AM | 124.2 | 35.8 | 7 | 0.025 | .128 | 5.1 |
| 2 AM | 129.3 | 30.7 | 6 | 0.025 | .128 | 5.1 |
| 3 AM | 134.4 | 25.6 | 5 | 0.025 | .128 | 5.1 |
| 4 AM | 139.5 | 20.5 | 4 | 0.025 | .128 | 5.1 |
| 5 AM | 144.6 | 15.4 | 3 | 0.025 | .128 | 5.1 |
| 6 AM | 149.7 | 10.3 | 2 | 0.025 | .128 | 5.1 |
| 7 AM | 154.9 | 5.1 | 1 | 0.025 | .128 | 5.2 |
| 8 AM | 160.0 | 0.0 | 0 | 0.025 | OFF | 5.1 |

METHOD AND APPARATUS FOR CONTROLLED OFF PEAK LOAD HOT WATER HEATING

BACKGROUND OF THE INVENTION

1. Field

The present invention relates to hot water heater control devices and in particular to an apparatus and method for controlled heating of water during off peak load hours.

2. Description of Prior Art

U.S. Pat. No. 2,238,624 to Clark illustrates an off peak hour water heater control. This control is designed to turn on a hot water heater at the proper time to heat the water to a desired temperature by a specified hour when the heater is turned off. Both the time and temperature are measured continuously so that the heater will be turned on when the water falls to the "critical temperature" at that moment. Basically the water is at its "critical temperature" when the length of time required to heat the water at full heater power, from its present temperature to the desired temperature, equals or exceeds the length of time remaining until the specified cut off hour. For example, assuming a desired temperature of 180° by 8:00 A.M. and further assuming a hot water heater that heats the water 10° per hour, at full power some critical temperatures are as follows:
100° at 12:00 A.M.
120° at 2:00 A.M.
140° at 4:00 A.M.
160° at 6:00 A.M.
Thus, the heater is turned on at 12:00 A.M. if the water is 100° or less.

The control can be manually adjusted to compensate for different full power heating rates of different hot water heaters.

Although Clark attempts to heat the water to a desired peak temperature by a predetermined time, his device is not designed to adjust the heating element to only a portion of its maximum power; rather, it always operates at full power. Thus, Clark acts only to turn on the hot water heater at the appropriate starting time and turn off the heater at the specified hour. In contrast to Clark, the present invention adjusts the power input to the heater in order to attempt to heat the water using less than the maximum heater power. By adjusting the power of the heater, the water can be heated over a predetermined period of time while automatically compensating for the characteristics of the heater, the starting temperature of the water and hot water use during the time interval.

There are various other timing devices on the market for turning on and off hot water heaters or related appliances. However, none of these timing devices take advantage of the potential load spreading afforded by adjusting the input to the heater in order to raise the temperature of the water over a predetermined time interval. Additionally, none of these can automatically compensate for hot water use during the time interval.

SUMMARY OF THE INVENTION

The present invention overcomes many of the difficulties inherent in prior art off peak load heating systems by providing an apparatus and method for automatically controlling the level of power of a heating element in a hot water heater to heat the water to a desired peak temperature over a predetermined period of time. The method is characterized by the steps of determining the temperature of water in a hot water heater, computing the portion of the maximum power of the heater that is required to raise the temperature of the water over a predetermined segment of the predetermined period of time an amount that is proportional to the total desired temperature increase over the entire predetermined period of time, setting the power of the heater to the computed amount, waiting until the end of the predetermined segment of the predetermined period of time, determining the new temperature of the water in the heater, and repeating the steps until the predetermined period of time has ended. The method also determines and uses the relationship of the previously set proportion of the maximum power of the heater to the increase in the temperature of the water achieved during the previous time segment in order to aid in the computing step.

It is therefore an object of the present invention to provide an improved method and apparatus for heating water over a predetermined period of time to a desired temperature.

Another object of the present invention is to provide a method and apparatus for off peak load hot water heating that automatically adjusts for the starting temperature of the water and for use during the heating period.

Another object of the present invention is to provide a method and apparatus for off peak load hot water heating that automatically adjusts for the heating characteristics of the hot water heater.

An additional object of the present invention is to provide a method and apparatus for off peak load time water heating that heats the water at reduced power over a longer period of time than conventional hot water heater timers in order to further reduce the peak load demanded by the hot water heater.

A further object of the present invention is to provide a method and apparatus for off peak load time water heating that automatically adjusts the input to the heating element of the water heater in order to reduce energy consumed by the heater whenever possible.

The foregoing objects, advantages, features and results of the present invention together with the various other objects, advantages, features and results thereof which will be evident to those skilled in the art in light of this disclosure may be achieved with the exemplary embodiment of the invention described in detail hereinafter and illustrated in the accompanying drawings.

BRIEF DESCRIPTION OF THE DRAWINGS

FIG. 4 is a graph showing the temperature rise over time of the water in the hypothetical heater of FIG. 3.

DESCRIPTION OF THE PREFERRED EMBODIMENT

The present invention relates to a method and apparatus for incrementally heating water during the off peak load hours to a predetermined peak temperature at the end of a predetermined time interval. This reduces the power demand during peak load hours.

Like prior art off peak load time devices, the method and apparatus heat a tank of water sufficiently large to meet the hot water needs for the entire day by the start of the day. However, unlike such prior devices, the invention automatically compensates for the heating characteristics of the particular water heater, and for hot water use during the heating period. This compensation is accomplished by periodically checking the temperature of the water in the heater and then calculating the amount of power required to raise the temperature of the water during the next period a determined amount. The magnitude of the desired temperature change is determined by calculating the number of periods remaining until the system shuts off and dividing this number into the total desired change in temperature from the present time to system shut-off. Since these calculations are repeated periodically, the invention automatically adjusts for any hot water use during a period by increasing the power to the heater element during the following periods.

Figure 1:
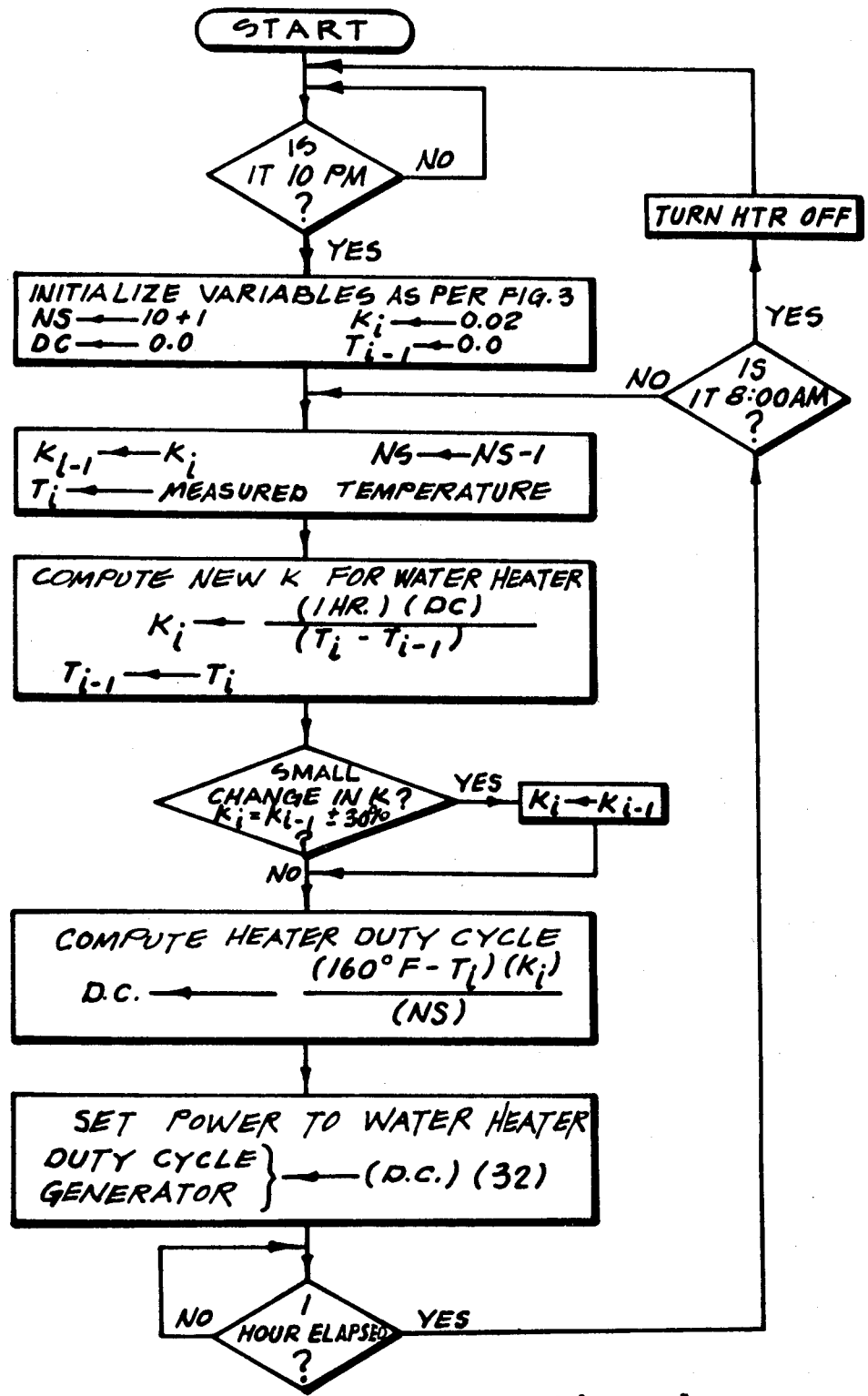
FIG. 1 is a flow diagram illustrating the sequence of operations of a preferred embodiment of the present invention.

For the purposes of FIG. 1, assume that it is desired to heat the water from 10:00 P.M. until 8:00 A.M. and that each time segment of the overall 10 hour time period is one hour in duration.

Referring now to FIG. 1, it can be seen that the hot water heater is off until 10:00 P.M. If this method is practiced by a microprocessor, it could check a clock to determine the beginning of the time period, the beginning and end of each time segment, and the end of the time period. The clock could be a seven day clock to enable different starting and stopping times depending on the day of the week. Other clocks could also be employed. For example, a one year clock that enables the starting and stopping times to vary according to the season could be used. Once the time period begins, the heater is turned on for the next time segment, in this case an hour, at a percentage of maximum heater power (also referred to as the "DUTY CYCLE"). In computing the DUTY CYCLE the desired change in temperature, the length of time remaining, and the heating characteristics of the particular hot water heater are taken into account. To compute the DUTY CYCLE, the present temperature of the water is read and the following formula is applied:

$$\text{DUTY CYCLE} = \left(\frac{\Delta T}{NS}\right) K$$

Where
$\Delta T$ = the desired temperature—the present temperature,
NS = the number of segments remaining until system shut-off
K = length of the preceding time period times the percentage of power applied during that period (i.e. DUTY CYCLE), divided by the present temperature ($T_i$) minus the temperature at the start of the preceding time segment ($T_{i-1}$) or $$\frac{ET(\text{Elapsed Time in hours}) \times \text{DUTY CYCLE}_{i-1}}{T_i - T_{i-1}},$$

$T_i - T_{i-1}$ = the temperature increase during the preceding time segment; this quantity conveniently can be called T Rise.

Since there is no information on the T Rise or the magnitude of the previous DUTY CYCLE until the second segment, K is initially set according to the specifications of the particular hot water heater. For example, consider a heater that heats water 50° in an hour under full power. The K value of such a heater initially is computed as follows:

$$K = \frac{ET \times \text{DUTY CYCLE}_{i-1}}{T_i - T_{i-1}} = \frac{1 \times 1}{50° \text{ F.}} = .02$$

The heater must then be set to the power level computed. Most hot water heaters do not have any power control for the heating element other than on/off control. Therefore, some provision must be made for adjusting the power of the heater. One manner is to turn on and off the input to the heater in order to reduce the total energy consumption per unit of time. The total energy consumed by the water heater in a time period is determined by the average power applied to the water heater during the time period. This can be accomplished for an electrically powered heater by counting the AC cycles and applying less than all of the cycles in each time unit to the heater. The number of cycles per time unit applied to the heater is, of course, dependent upon the DUTY CYCLE computed. By way of example, assume further that the computations indicated that 25% of the heater power should be applied for the next time period. Then four cycles would be input to the heater followed by 12 cycles not input to the heater, etc. This would have the effect of powering the heating element at 25% level.

At the end of the time segment the temperature of the water is again read. The K is computed for the heater; if the value of K is within 30% of the previously calculated value ($K_{i-1}$), then the next DUTY CYCLE is computed using the new K value. On the other hand, if K is not within 30% of ($K_{i-1}$), then K is set to its previous value ($K_{i-1}$) in order to avoid wide fluctuations in the value of K. It should be noted that the T Rise would be quite low, for example, if a substantial amount of hot water was consumed during the previous time segment. These steps are repeated until 8:00 A.M., at which time the temperature of the water in the heater will normally have been raised to the desired temperature. Of course, there is a limit to the amount of water the heater can heat a given number of degrees in a given time period, even under full power. Thus, if an amount of water heating greater than this limit must be achieved, for example, because of high consumption, the water will not reach the desired temperature by the end of the heating period.

Figures 2, 3:
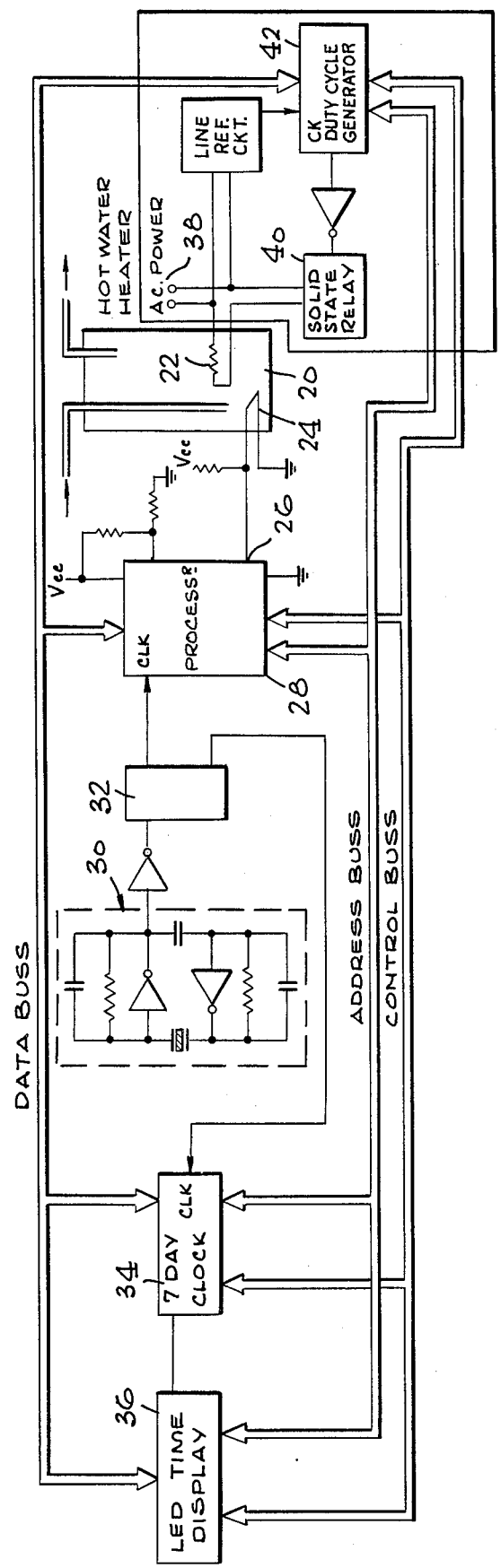
FIG. 2 is a schematic diagram illustrating some of the components that may be used in connection with the present invention.
FIG. 3 is a chart illustrating the temperature change over the predetermined time period together with the portion of maximum heater power for each time segment in a hypothetical hot water heater with no hot water consumption during the period.

FIG. 2 is a schematic diagram illustrating the various components of an embodiment of the invention. The lines labeled Data Buss, Address Buss and Control Buss indicate the flow of information between and among the various components illustrated in the Figure. They do not necessarily indicate the actual physical connections among the components.

A hot water heater 20 containing a heating element 22 is supplied with a temperature sensing element 24. The temperature sensing element may be a thermistor whose resistance changes with temperature, or any other transducer that can be used to read temperature. The thermistor is connected to an input port 26 on a microprocessor 28. The microprocessor converts the analog reading from the thermistor to a digital value suitable for computations. The microprocessor may be programmed to follow the steps outlined above in connection with the discussion of FIG. 1.

Elements within the area enclosed by dotted lines and designated by the numeral 30 comprise a timing signal generator. These elements produce a signal of a very high frequency. That frequency is fed to a divider 32 which divides the frequency by 4 to clock the microprocessor and divides the frequency by 256 to clock a 7-day clock 34. An LED time display 36 indicates the time.

An AC power source 38 is selectively passed to the heating element 22 by a solid state relay 40. The solid state relay is activated by a duty cycle generator 42.

The duty cycle generator in connection with the solid state relay adjusts the power to the heating element 22 by changing the number of cycles that are input to the heater per unit of time as described below. See FIG. 2. Frequency is determined by the AC power cycle via the line reference circuit. The line reference circuit generates a clock signal at the AC power frequency. It also provides isolation from the high AC voltage. The function of the duty cycle generator could be performed by several means such as (1) a presetable counter based circuit, (2) a parallel loaded shift register based circuit or (3) directly by the microprocessor.

Referring now to FIGS. 1 and 3, the data for a hypothetical heating system employing a heater that, under full power, heats water 50° an hour, is illustrated. In this example it is desired to heat the water to 160° by 8:00 A.M. The initial water temperature at 10:00 P.M. is 110°. As noted above $$\text{DUTY CYCLE} = \left(\frac{\Delta T}{NS}\right) K$$

$\Delta T$ (desired T−present T) is computed as 160°−110° or 50°. NS, the number of segments, in this case hours, until 8:00 A.M., is 10. At this time K is set equal to 0.02. As described above, the calculation is as follows:

$$K = \frac{ET \times \text{DUTY CYCLE}_{i-1}}{T_i - T_{i-1}} = \frac{1 \times 1}{50} = .02$$

The DUTY CYCLE therefore is computed as:

$$\text{DUTY CYCLE} = \frac{\Delta T}{NS} \times K = \frac{50}{10} \times .02 = .10$$

A DUTY CYCLE of 0.10 is equivalent to 10% of the heater power. Therefore, if the duty cycle generator in FIG. 2 counts sixteen cycles in half cycle steps, it would be set to 10% or one and one half cycles. Thus, the first three half cycles of current (1, 2, 3) would be passed to the heating element by the solid state relay. The succeeding twenty-nine half cycles (4–32) would not be passed by the relay. The duty cycle generator automatically resets and begins counting again to actuate the solid state relay during the first three cycles etc. This continues until the DUTY CYCLE is reset at the next hour.

At the start of the next time segment the value for K can be determined from the data available. At 11:00 P.M. T is 114° so that $T_i - T_{i-1} = 114° - 110° = 4°$ which, divided into the product of 1 hour times the previous DUTY CYCLE of 0.1, yields a value of 0.025 for K. $\Delta T = 160 - 114 = 46$; NS=9. The new DUTY CYCLE is then computed as before, using the new values for $\Delta T$, NS and K.

$$\left(\frac{46}{9}\right).025 = .128$$

This number means 12.8% of full power, at which the heater then is caused to operate for the next segment.

The "read temperature," "compute DUTY CYCLE," and "set hot water heater" steps are repeated each hour until 8:00 A.M. As can be seen from the graph of FIG. 4, assuming no hot water consumption during the period, the temperature rise is essentially linear over time.

One of the advantages of the present method is that since the temperature setting is readjusted every hour, compensation is automatically effected for any hot water use during the time period in which the system is in operation. The prior art timing mechanisms could not provide such compensation and accordingly substantial hot water use during the heating period would lower the temperature of the water attained at system shut-off.

Now consider the situation in which hot water is consumed during the heating period. Assume that in the previous example the household used some hot water between 3:00 A.M. and 4:00 A.M. Depending on the amount of water used the water temperature at 4:00 A.M. would be lower than illustrated in FIG. 3. For the sake of discussion, assume that enough hot water was used to reduce the temperature of the water to 139° at 4:00 A.M. It will be recalled that in the previous example the temperature of the water was 139.5° at 11:00 P.M. The calculations for the power setting for the next time period would be as follows:

$\Delta T = 160 - 139 = 21$ $T\ Rise = 139 - 134.4 = 4.6$ $\text{DUTY CYCLE}_{i-1} = 0.128$ $$K = \frac{.128}{4.6} = .0278$$

$K_{i-1} \pm 30\% = 0.0125 - 0.3 \times 0.0125$ to
$0.0125 + 0.3 \times 0.0125 = 0.0175$ to $0.0325$ (Note that the new K value, 0.0278, is within 30% of the previous K value.)

$NS=4$ $$\text{DUTY CYCLE}_i = \frac{21}{4} .0278 = .14595$$

which is approximately 15%.

It can be appreciated that the DUTY CYCLE 0.15 is greater than that computed in the previous example 0.13. This higher DUTY CYCLE, of course, would cause the heater to be set to a higher power to compensate for the hot water use.

It should be noted that various factors other than hot water consumption in practice will affect the heater's capability of heating the water linearly over time. The heat retention properties of the insulation, for example, are inversely proportional to the difference in temperature between the inside and outside of the heater. Therefore, greater heat loss results during the final time segments when the temperature of the water is higher. The outside air temperature may also vary, as may the temperature of the water entering the heater. Also, heating ability of the heater may not be proportional to percentage of power at which the heater is being operated. In this respect the data illustrated is exemplary only and the actual performance of the method and system in practice will depend upon factors such as the heating characteristics and heat retention properties of the particular heater selected.

It can be understood that what has been described is a novel method and apparatus for off peak load hot water heating that automatically adjusts for the starting temperature and for use during the heating period. In addition, the method and apparatus automatically adjusts for factors such as the individual characteristics of the particular hot water heater. Unlike the prior art systems wherein the timer would have to be manually pre-set according to the characteristics of the particular heater, the present invention automatically adjusts the power input to the heater to compensate for slower or faster heating hot water heaters.

We claim:

1. A method of heating water over a predetermined period of time comprising the steps of:
   (1) determining the temperature of water in a water heater;
   (2) computing the portion of the maximum power of the heater that is required to raise the temperature of the water over a predetermined segment of the predetermined period of time an amount that is related to the total desired temperature increase over the entire predetermined period of time;
   (3) setting the power of the heater to the computed portion;
   (4) waiting until the end of the predetermined segment of the predetermined period of time;
   (5) determining the new temperature of the water in the heater;
   (6) determining a K value from the relationship of the previously set portion of the maximum power of the heater to the increase in the temperature of the water during the previous time segment;
   (7) computing the portion of the maximum power of the heater that is required to raise the temperature of the water over the next predetermined segment of the remaining portion of the predetermined period of time an amount that is related to the total desired temperature increase over the remaining portion of the predetermined period of time using the value of K determined in Step 6 to aid in the computation;
   (8) resetting the power of the heater to the computed amount from Step 7;
   (9) repeating Steps 4 through 9 until the predetermined period of time has ended.

2. The method of claim 1 wherein each of said computing steps includes dividing the desired temperature change (the desired temperature minus the present temperature) by the number of predetermined segments.

3. The method of claim 2 wherein Step 7 includes multiplying the quotient of claim 2 by the value of K determined in Step 6.

4. A method of heating water over a predetermined period of time comprising the steps of:
   (1) determining the temperature of water in a water heater;
   (2) computing the portion of the maximum power of the heater that is required to raise the temperature of the water over a predetermined segment of the predetermined period of time an amount that is related to the total desired temperature increase over the entire predetermined period of time;
   (3) setting the power of the heater to the computed amount;
   (4) waiting until the end of the predetermined segment of the predetermined period of time;
   (5) determining the new temperature of the water in the heater;
   (6) computing the portion of the maximum power of the heater that is required to raise the temperature of the water over another predetermined segment of the remaining portion of the predetermined period of time an amount that is related to the total desired temperature increase over the entire remaining portion of the predetermined period of time;
   (7) resetting the power of the heater to the computed amount of Step 6.

5. A method as in claim 1 or 4 wherein each of said setting steps is performed by passing only a portion of an AC input signal to the heater.

6. A method as in claim 4 further including the step of: repeating Steps 4 through 8 until the predetermined period of time has ended.

7. A device for controlling a hot water heater to heat water to a desired temperature by the end of a predetermined time period comprising:
   clock means for keeping track of time;
   temperature sensing means communicating with the water in said hot water heater for determining the temperature of the water;
   input power adjusting means operationally connected to said hot water heater for adjusting the power input to said hot water heater; and
   processing means operationally connected to said temperature sensing means, said clock means, and said input power adjusting means for repeatedly determining the number of time segments remaining until the end of the time period, computing the proportion of heater power necessary to raise the temperature of the water over the next segment of the time period an amount that is related to the total desired increase in temperature for the entire time period, and for setting said power adjusting means to the computed proportion.

8. A device as in claim 7 wherein said clock means comprises a seven day clock whereby said processing means can be set to adjust the desired temperature, the length of the predetermined time period, and the number of and length of each time segment, according to the day in the week.

9. A device as in claim 7 wherein said temperature sensing means comprises a thermistor in combination with a voltage source.

10. A device as in claim 7 wherein said input power adjusting means comprises pulse means for passing only a portion of an AC input signal to the heater.

11. A method of heating water over a period of time comprising the steps of:
  (1) determining the temperature of water in a water heater;
  (2) computing and setting the heating means of the heater for that being required to raise the temperature of the water over a predetermined segment of the predetermined period of time an amount that is related to the total desired termperature increase over the entire predetermined period of time;
  (3) waiting until the end of the predetermined segment of the predetermined period of time;
  (4) determining the new temperature of the water in the heater;
  (5) computing and resetting the heating means of the heater for that being required to raise the temperature of the water over another predetermined segment of the remaining portion of the predetermined period of time an amount that is related to the total desired temperature increase over the entire remaining portion of the predetermined period of time.

12. A method as in claim 11 further including the step of: repeating Steps 3 through 5 until the predetermined period of time has ended.

13. A device for controlling a hot water heater to heat water to a desired temperature by the end of a predetermined time period comprising:
  means for keeping time;
  temperature sensing means communicating with the water in said hot water heater for determining the temperature of the water;
  adjustable heating means operationally connected to said hot water heater for heating water in said hot water heater;
  processing means operationally connected to said temperature sensing means, said time means, and said adjustable heating means for repeatedly determining the number of time segments remaining until the end of the time period, computing heating means necessary to raise the temperature of the water over the next segment of the time period an amount that is related to the total desired increase in temperature for the entire time period, and for setting said adjustable heating means to the computed proportion.

14. A device as in claim 13 wherein said time means comprises a seven day clock whereby said processing means can be set to adjust the desired temperature, the length of the predetermined time period, and the number of and length of each time segment, according to the day in the week.

* * * * *